United States Patent
Culler et al.

(10) Patent No.: US 7,203,043 B2
(45) Date of Patent: Apr. 10, 2007

(54) METHOD AND STRUCTURE FOR EXTERNAL CONTROL OF ESD PROTECTION IN ELECTRONIC CIRCUITS

(75) Inventors: Jason Harold Culler, Livermore, CO (US); Peter Shaw Moldauer, Wellington, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 488 days.

(21) Appl. No.: 10/448,763

(22) Filed: May 30, 2003

(65) Prior Publication Data
US 2004/0240129 A1 Dec. 2, 2004

(51) Int. Cl.
- H02H 3/20 (2006.01)
- H02H 3/22 (2006.01)
- H02H 9/04 (2006.01)

(52) U.S. Cl. .................. 361/56; 361/56; 361/91.1; 361/111

(58) Field of Classification Search .......... 361/56, 361/111, 91.1
See application file for complete search history.

(56) References Cited

U.S. PATENT DOCUMENTS

| | | | |
|---|---|---|---|
| 5,301,084 A * | 4/1994 | Miller | 361/56 |
| 5,546,038 A * | 8/1996 | Croft | 327/310 |
| 6,157,530 A * | 12/2000 | Pequignot et al. | 361/111 |
| 6,801,416 B2 * | 10/2004 | Hatzilambrou et al. | 361/56 |

FOREIGN PATENT DOCUMENTS

| | | |
|---|---|---|
| JP | 09-121453 | 5/1997 |
| WO | WO01/78148 | 10/2001 |

* cited by examiner

*Primary Examiner*—Z Kitov

(57) ABSTRACT

A method and structure for external control of an electrostatic discharge (ESD) protection of electronic devices. According to the structure, one or more shunt circuits are coupled to the electronic devices and one or more external contacts are coupled to the one or more shunt circuits. One or more power supplies are further coupled to the one or more shunt circuits prior to the shunt circuits being coupled to the electronic devices. According to the method, the one or more external contacts are operable to be used to perform on or more of: grounding one or more of one or more external contacts coupled to the one or more shunt circuits, supplying one or more DC signals to one or more of the one or more shunt circuits via one or more of the one or more external contacts, and supplying one or more AC signals to one or more of the one or more shunt circuits via one or more of the one or more external contacts.

10 Claims, 7 Drawing Sheets

100

300

METHOD AND STRUCTURE FOR EXTERNAL CONTROL OF ESD PROTECTION IN ELECTRONIC CIRCUITS

TECHNICAL FIELD

This invention relates generally to the field of electronic circuits, and more specifically to electronic circuits containing Electrostatic Discharge (ESD) protection.

BACKGROUND

Electrostatic discharge, or ESD, is a serious operational and design issue in electronic circuits. If an unprotected electronic device experiences a power surge or electrostatic discharge from a person or machine, the components within the device could experience voltage levels that exceed design guidelines. The components may become permanently damaged or fail to operate correctly. One approach to this problem is to couple the unprotected electronic device to an ESD protection circuit. The goal of the ESD protection circuit is to act as a barrier to power surges. The ESD protection circuit may provide ESD protection by shunting to ground any incoming power level that exceeds a predetermined level. However, this type of ESD protection is not externally controllable and does not allow the ESD protection circuit to be used for applications beyond ESD protection.

SUMMARY

A method and structure for external control of an electrostatic discharge (ESD) protection of electronic devices is disclosed. According to a structure, shunt circuits are coupled to the electronic devices and external contacts are coupled to the shunt circuits. One or more power supplies are further coupled to the shunt circuits prior to the shunt circuits being coupled to the electronic devices. The power supplies are coupled to the shunt circuits prior to the shunt circuits being coupled to the electronic devices so that a power surge of the power supply is coupled to ground. According to a method, the external contacts are operable to be used to perform on or more of: grounding one or more of the external contacts coupled to the shunt circuits, supplying one or more DC signals to one or more of the shunt circuits via one or more of the external contacts, and supplying one or more AC signals to one or more of the shunt circuits via one or more of the external contacts.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
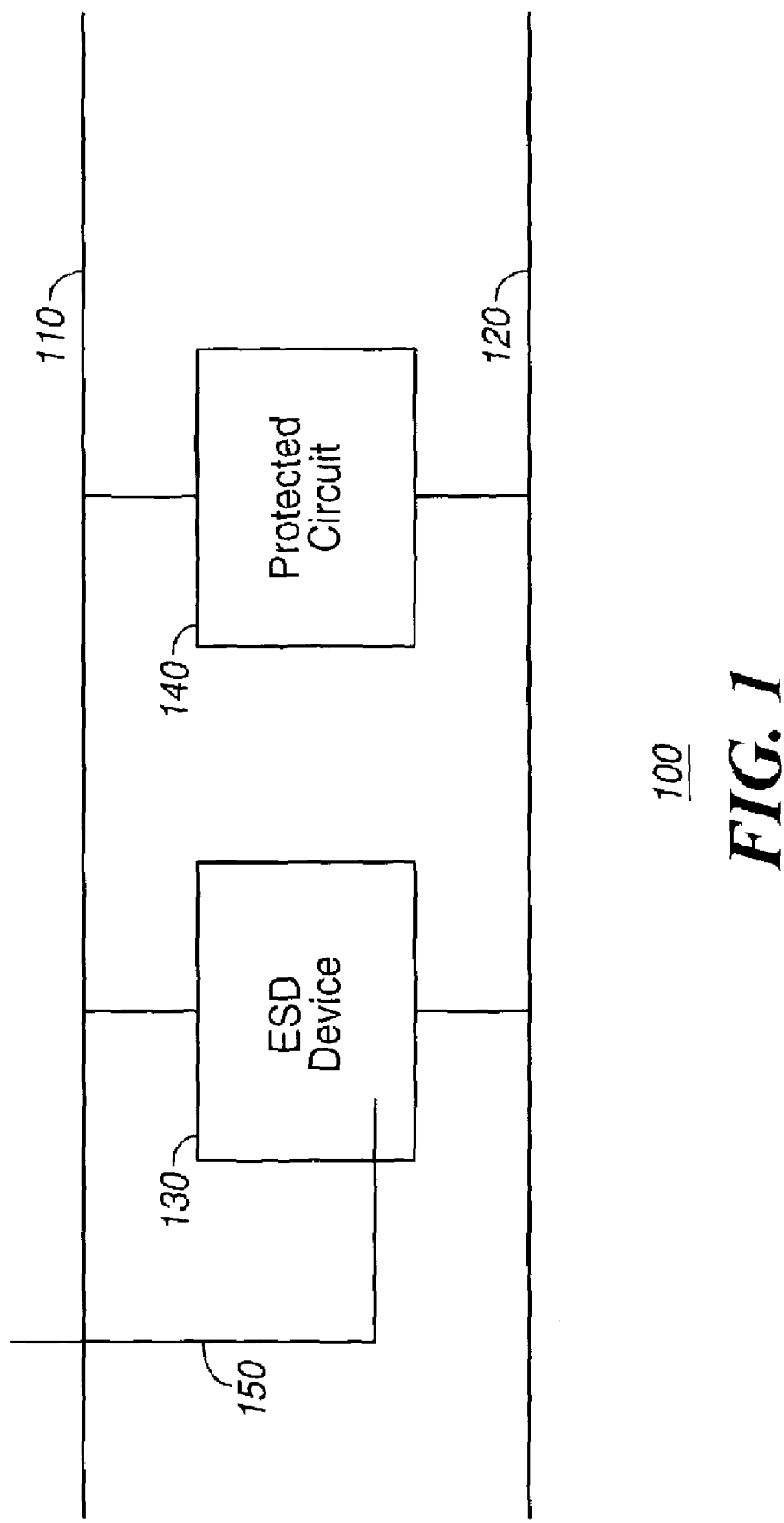
FIG. 1 is a basic diagram of an ESD device that is externally controlled, according to a certain embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring now to FIG. 1 a basic diagram 100 of an ESD device 130 that is externally controlled is shown, according to a certain embodiment of the present invention. ESD device 130 is coupled to supply voltage 110 and coupled to ground 120. External input 150 controls operation of ESD device 130. Protected circuit 140 is coupled to supply voltage 110 and coupled to ground 120. In a certain embodiment of the present invention, protected circuit 140 is in a parallel circuit arrangement with ESD device 130 relative to ground 120 and supply voltage 110 . An input voltage surge of supply voltage 110 causes ESD device 130 to short to ground, thereby protecting protected circuit 140. In certain embodiments of the present invention, ESD device 130 is a diode chain in which one or more diodes are connected in serial, wherein each diode of the one or more diodes has a same orientation. The diode chain possesses a number of diodes in accordance with a value of supply voltage 110 . In a certain embodiment of the present invention, external input 150 is operable to provide ESD device 130 with one of a grounded signal, a DC signal, or an AC signal. The grounded signal is operable to enable ESD device 130 to be coupled to ground 120. In certain applications, such as switching in integrated circuits, ESD device 130 may be coupled to ground during a power-up phase of protected circuit 140. Coupling ESD device 130 to ground 120 is operable to allow protected circuit 140 to switch on at a fast rate without activating ESD protection. In a certain embodiment of the present invention, the DC signal is operable to enable ESD device 130 to be used as a heat generation device. The AC signal is operable to enable ESD device 130 to be used as a power supply stabilization device. In a certain embodiment of the present invention, the AC signal is operable to reduce one or more power oscillations of a power supply coupled to supply voltage 110.

Figure 2:
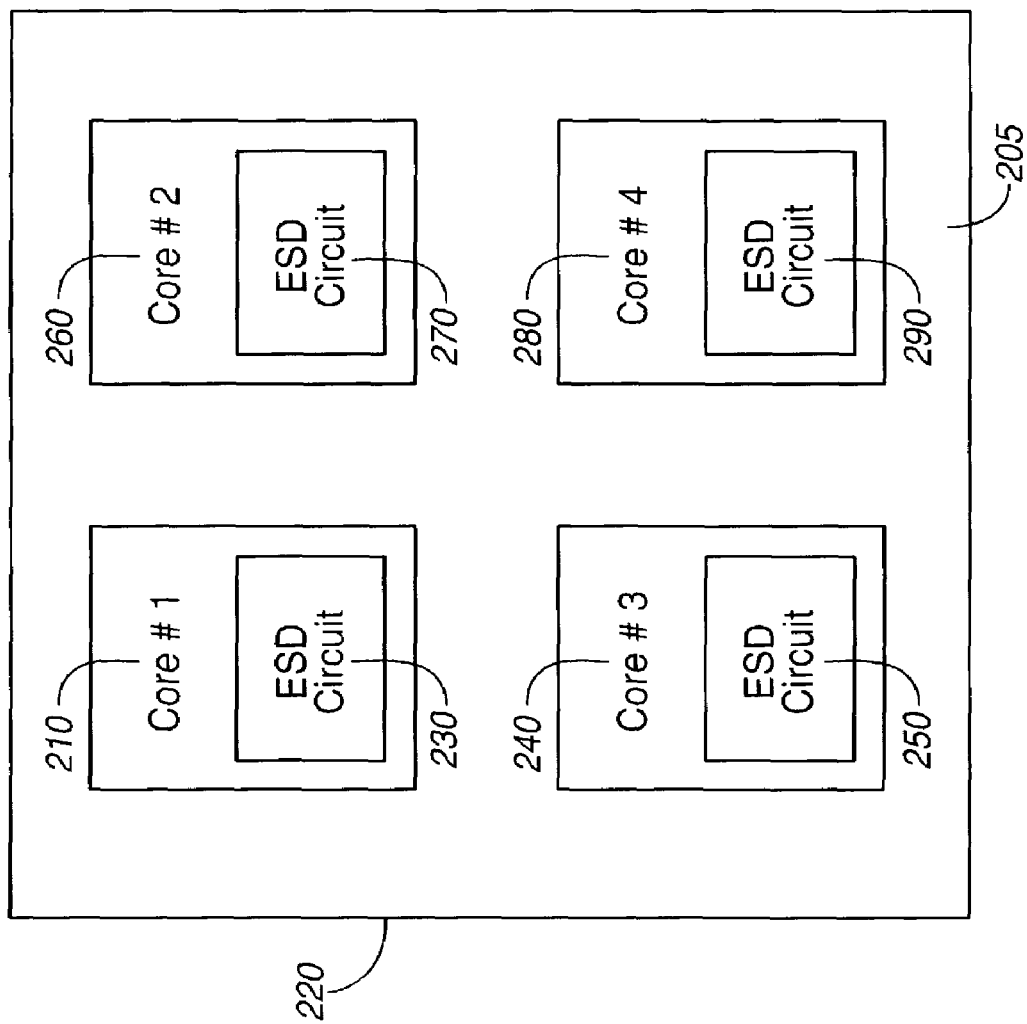
FIG. 2 is a system drawing of a plurality of ESD devices coupled to a plurality of cores, in accordance with certain embodiments of the present invention.

Referring now to FIG. 2 a system drawing 200 of a plurality of ESD devices (shown as 230, 250, 270, 290) coupled to a plurality of cores (210, 240, 260, 280) is shown, according to a certain embodiment of the present invention. The plurality of cores (210, 240, 260, 280) are coupled to an electronic circuit 205. Electronic circuit 205 might, for example, be an integrated circuit or a printed circuit board (PCB). Electronic circuit 205 may also be part of a test integrated circuit package, wherein the integrated circuit package comprises a plurality of elements similar to electronic circuit 205. The plurality of ESD devices (230, 250, 270, 290) further comprise a corresponding plurality of external connections. The plurality of external connections may be coupled to the plurality of cores (210, 240, 260, 280) or may be coupled to an external control device. It is noted that one or more of the plurality of external connections may be further coupled together to enable an input signal to be coupled to the one or more external connections. The use of an input signal coupled to one or more external connections may be used, for example, to synchronously control an operation of one or more of the plurality of ESD devices (230, 250, 270, 290). In a certain embodiment of the present invention, each of the plurality of cores (210, 240, 260, 280) has a separate power supply and each of the plurality of cores (210, 240, 260, 280) is coupled to a distinct ESD device of the plurality of ESD devices (230, 250, 270, 290).

Figure 3:
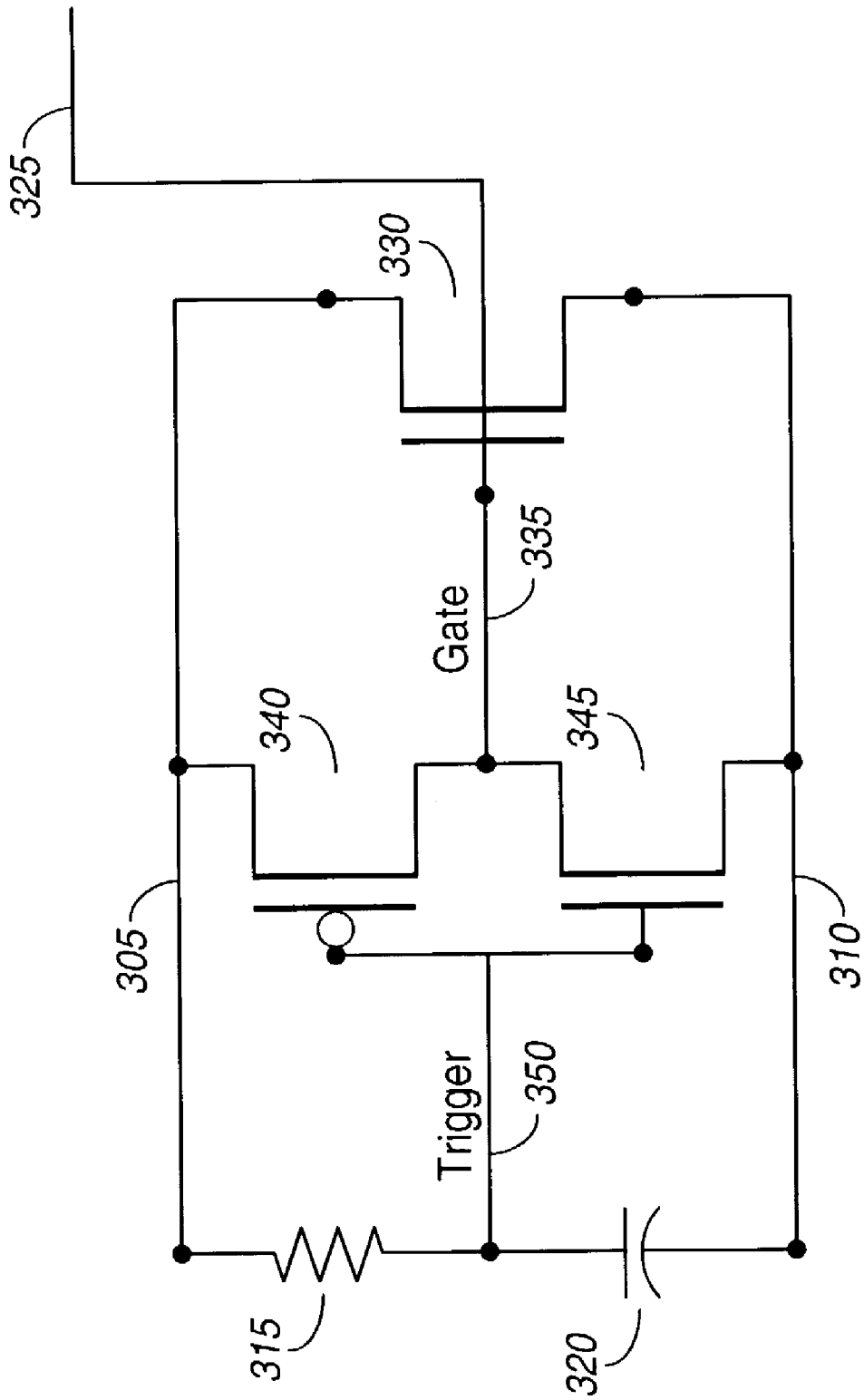
FIG. 3 is a first schematic drawing of a single core shunt, in accordance with certain embodiments of the present invention.

Referring now to FIG. 3 a first schematic drawing of a single ESD device (core shunt) 300 is shown, according to a certain embodiment of the present invention. Single core shunt 300 comprises a first terminal of resistive element 315 coupled to a first terminal of capacitive element 320. In a certain embodiment of the present invention, resistive element 315 and capacitive element 320 form an RC circuit. In certain embodiments of the present invention, the RC circuit has a time constant of approximately 60 nanoseconds (ns). A second terminal of capacitive element 320 is further coupled to ground 310. A second terminal of resistive element 315 is coupled to supply voltage 305. The first terminal of resistive element 315 and the first terminal of capacitive element 320 are also coupled to a first terminal of transistive element 340 and a first terminal of transistive element 345. In a certain embodiment of the present invention, the first terminal of transistive element 340 is inverted. A second terminal of transistive element 340 is coupled to supply voltage 305, while a second terminal of transitive element 345 is coupled to ground 310. A third terminal of transitive element 340 is coupled to a third terminal of transistive element 345. The third terminal of transitive element 345 and the third terminal of transistive element 340 are further coupled to a second terminal of transistive element 330. In a certain embodiment of the present invention, the third terminal of transistive element 340 and the third terminal of transistive element 345 are corresponding gates 335 of field effect transistors. In certain embodiments of the present invention, gates 335 require approximately 10 milliAmperes (mA). A first terminal of transistive element 330 is coupled to supply voltage 305, while a third terminal of transistive element 330 is couped to ground 310. Single core shunt 300 has an external contact 325 coupled to the second terminal of transistive element 330.

External contact 325 is operable to be coupled to one of a ground signal, an AC signal, and a DC signal. In a certain embodiment of the present invention, coupling a DC signal to external contact 325 may be used to perform any of three options:

1) Ground gates 335 to keep the core shunt 300 from turning on during a power-up stage.
2) Apply a constant DC signal to draw more power so that core shunt 300 may be used as a heater.
3) Apply a DC signal operable for use as a power supply stabilizer for an IO or core circuit. In the third option, core shunt 300 draws power only when the core circuit or IO is off so that when the IO or core circuit turns on it will appear that there has been a constant current or power draw with no big loads coming on. In a certain embodiment of the present invention, this third option may be used to load level using the core shunt.

The rationale for these three options is discussed below:

For option 1, system power up is a very complex process, with many different chips requiring different power-up sequences. Each chip may have separate on chip and on package supplies which require specific power-up timing due to ESD protection devices protecting and coupling them. Core shunt devices on the chips are designed to turn on very quickly to shunt excess voltage/current to ground. When a chip is powered up too quickly, the core shunts can be triggered to turn-on and shunt a bunch of current (the core shunts treat the powering up of the supply as an ESD event). So in general, powering up a system can be a complex timing sequence for all the chips in the system. By having the ability to temporarily disable or turn-off core shunts such as core shunt 300, it is possible to power the chips up very quickly and without complex power-up circuitry on the board.

Regarding option 2, on some chips with sensitive phase locked loops or delay locked loops (PLL/DLL), input/output (IO) circuits, analog circuits and/or measurement test structures, there is a need to keep the circuitry at a constant temperature. This is needed to keep the performance of the circuits from changing due to temperature. As an example, FETs slow down, and metal becomes more resistive as temp increases. By using heaters, or circuits that draw a load to maintain a constant heat background, the sensitive circuitry will behave much more stably. One issue is that heaters are large and expensive as far as space on the die. Since core shunts such as core shunt 300 may be placed and distributed all over the die, it is possible to use them as heaters to help maintain a fixed die temperature.

Regarding option 3, recent IO designs incorporate "current steering" as a way to help maintain a stable IO power supply. In end-terminated busses, there are fixed resistors pulling the bus up to VDD. When an IO pad needs to signal a 0 (or low) it pulls down with a pull-down NFET. When it needs to signal a 1 (or high), it releases the pull-down NFET and the termination resistors on the end of the bus pulls the buss back up to a 1 (or high). When the IO pad pulls down, there is current that flows through the pull-up resistors down through the pull-down NFET. This current only flows when the pad is pulling down, creating a non-uniform load demand on the IO power-supply. The power-supply, when subjected to changing loads can resonate and become unstable. With current steering you are always flowing that same current to ground internally on the chip when the pad is not pulling down. When the pad pulls down, the current steering device stops flowing the current. So in essence, to the power supply it looks like a constant load is present. Again, since adding any device is expensive due to space limitations on the die, by using the already existing ESD core shunts instead of the very large current steering devices for the same current steering operation we get a large die savings.

In an alternative embodiment of the present invention, an AC signal is coupled to external contact 325 on core shunt 300 so that a frequency dependent load is coupled to supply voltage 305. This frequency dependent load may be used:

1) For testing purposes. The frequency dependent load may be matched to a resonance on supply voltage 305 and capacitors and IO/core designs may be evaluated against a resonant power supply swing of supply voltage 305. The purpose of the test may be to examine the reliability of the integrated circuit.

2) For experimentation purposes. An injection of a swing or resonance on supply voltage 305 may be used to counteract a resonance already present from IO or core circuits.

Figure 4:
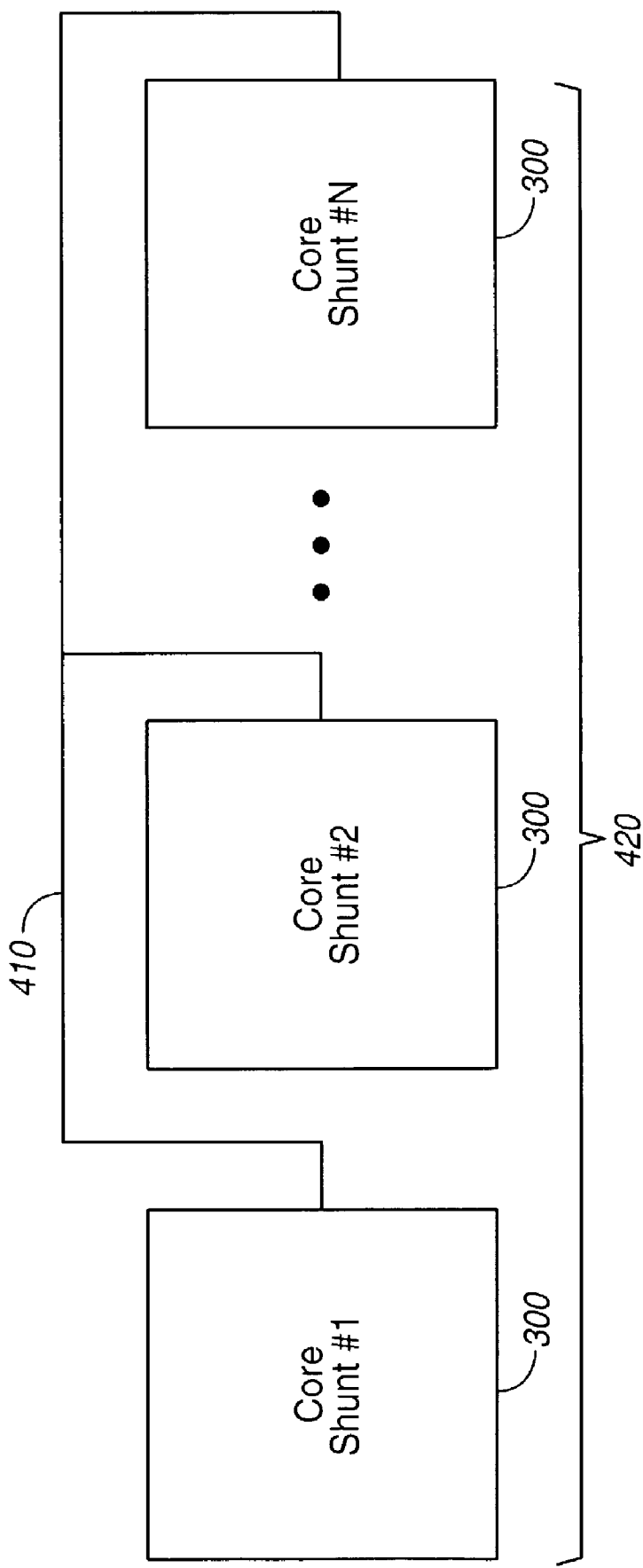
FIG. 4 is a second schematic drawing of a plurality of core shunts coupled to an external contact, in accordance with certain embodiments of the present invention.

Referring now to FIG. 4 a second schematic drawing 400 of a plurality of core shunts 420 coupled to an external contact 410 is shown, according to a certain embodiment of the present invention. Plurality of core shunts 420, represented as N of core shunt 300, are coupled to external contact 410. As mentioned in the description of FIG. 1, one or more of core shunts 420 could be implemented as a diode chain without departing from the spirit and scope of the present invention. The use of single external contact 410 is operable to allow the plurality of core shunts 420 to be controlled by a single external control signal, provided by external contact 410. In a certain embodiment of the present invention, external contact is coupled to the plurality of gates 335 of the N core shunt 300 elements.

Figure 5:
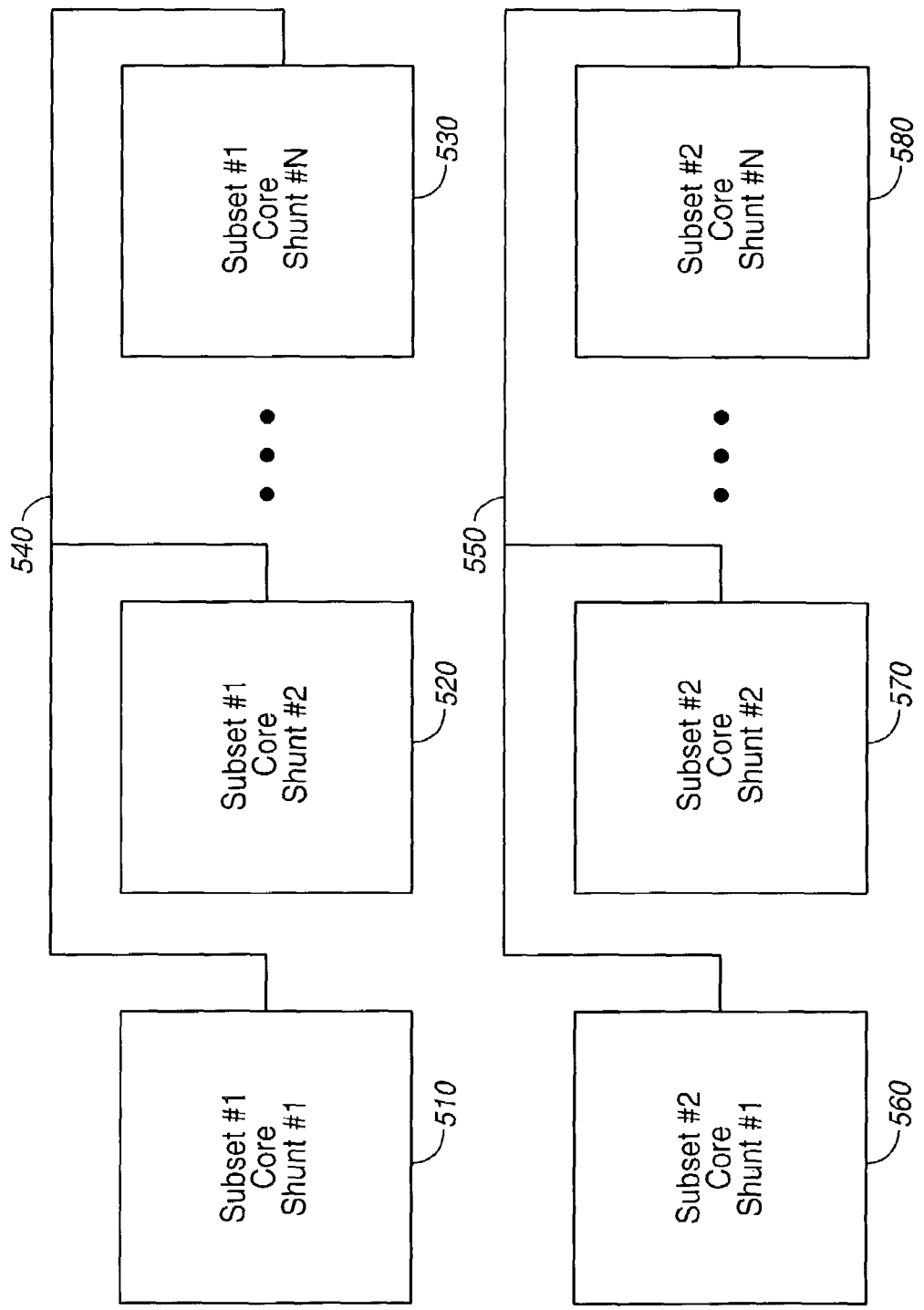
FIG. 5 is a third schematic drawing of a plurality of core shunts coupled to a plurality of external contacts, in accordance with certain embodiments of the present invention.

Referring now to FIG. 5 a third schematic drawing 500 of a plurality of core shunts coupled to a plurality of external contacts is shown, according to a certain embodiment of the present invention. Core shunts (510, 520, 530) are coupled to first external contact 540, while core shunts (560, 570, 580) are coupled to second external contact 550. The use of first external contact 540 and second external contact 550 is operable to enable the core shunts (510, 520, 530) to be controlled independently of core shunts (560, 570, 580). It is noted that although two external contacts are shown in FIG. 5, more external contacts could be grouped with core shunts (510, 520, 530) and core shunts (560, 570, 580) without departing from the spirit and scope of the present invention. It is further noted that a different number of core shunts could be used without departing from the spirit and scope of the present invention.

Figure 6:
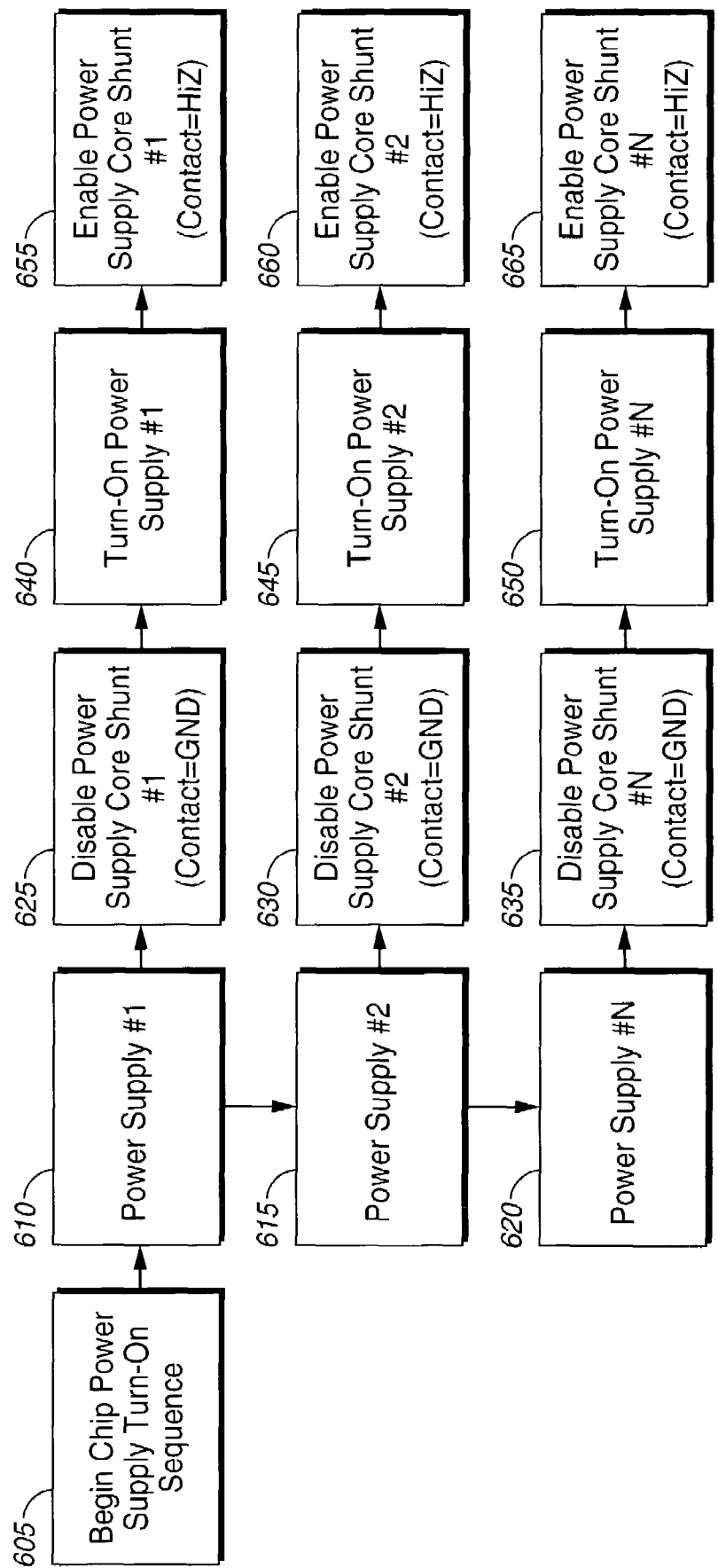
FIG. 6 is a flow diagram of an example method for disabling one or more core shunts during chip turn-on or power-up sequencing, in accordance with certain embodiments of the present invention.

Referring now to FIG. 6, a flow diagram 600 of an example method for disabling one or more core shunts during chip turn-on or power-up sequencing is shown, according to a certain embodiment of the present invention. A chip power-up sequence is started in block 605 for a plurality of power supplies (blocks 610, 615, 620). Prior to turning on the plurality of power supplies, a plurality of core shunts corresponding to the plurality of power supplies are disabled (blocks 625, 630, 635). In a certain embodiment of the present invention, the plurality of core shunts are disabled by coupling a plurality of external contacts to ground, wherein the plurality of external contacts are coupled to a plurality of gates of the plurality of core shunts. After the plurality of core shunts are disabled, the plurality of power supplies are turned on (640, 645, 650). After the plurality of power supplies are turned on, the plurality of core shunts are enabled (655, 660, 665). In a certain embodiment of the present invention, the plurality of core shunts are enabled by coupling the plurality of external contacts to a corresponding plurality of high signal values.

Figure 7:
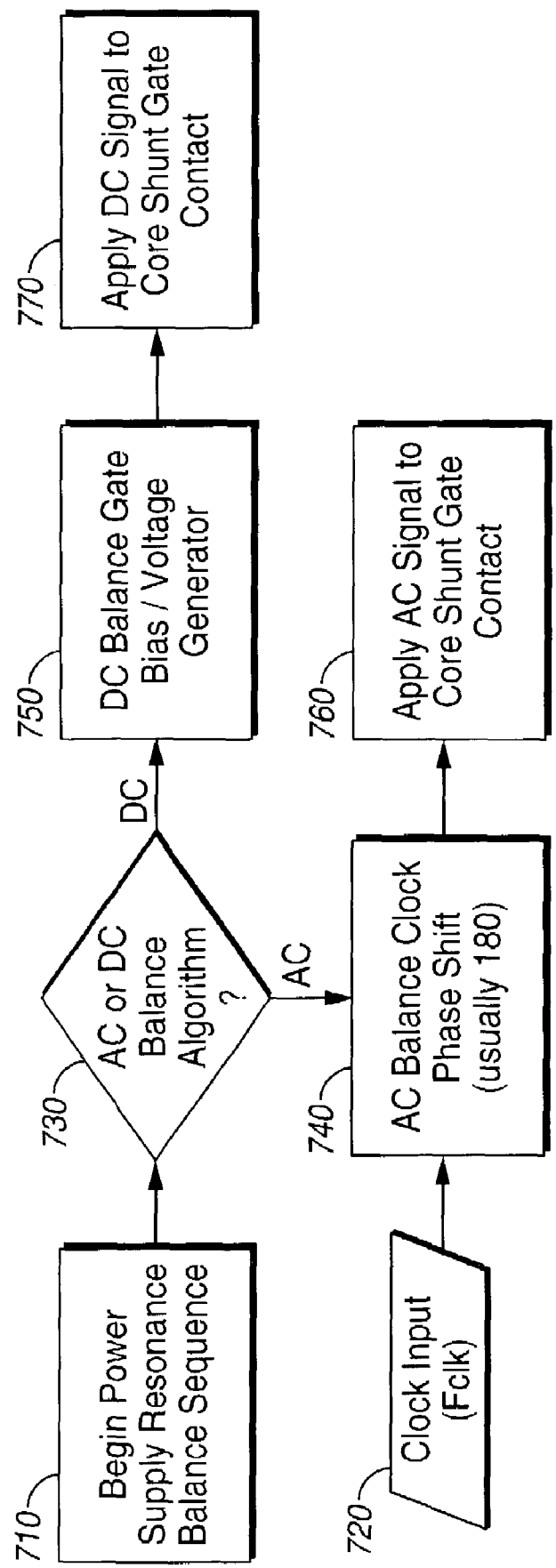
FIG. 7 is a flow diagram illustrating AC/DC power supply balancing, in accordance with certain embodiments of the present invention.

Referring now to FIG. 7, a flow diagram 700 illustrating AC/DC power supply balancing is shown, according to a certain embodiment of the present invention. After starting a power supply resonance balancing sequence (block 710), AC or DC balancing is selected (block 720). If AC balancing is selected a clock input (block 720) is used to balance a power supply signal. In a certain embodiment of the present invention, an AC signal is used which has a 180 degree phase shift relative to the power supply signal (block 740). The AC signal is then applied to an external contact coupled to a gate of the core shunt circuit as in block 760. If DC balancing is selected in block 730, then a DC voltage generator is used (block 750) generate a DC signal. The DC signal is then applied to the gate of the core shunt circuit as in block 770.

For an AC signal example, a frequency generator would be needed. In this case where the intent is to re-inject a signal that is identical to a system clock waveform except that it is out of phase so that together they cancel and we get a stable power supply.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A structure for external control of an electrostatic (ESD) discharge protection of one or more electronic devices, comprising:
    one or more shunt circuits coupled to the one or more electronic devices;
    one or more external contacts coupled to the one or more shunt circuits, wherein any external contact of the one or more external contacts is operable to be coupled to any one of a ground signal, an AC signal and a DC signal to provide external control of the functionality of the one or more shunt circuits through the one or more external contacts; and
    one or more power supplies coupled to the one or more shunt circuits wherein one or more supply signals of the one or more power supplies are coupled to the one or more shunt circuits spatially prior to the one or more shunt circuits being coupled to the one or more electronic devices.

2. The structure of claim 1, wherein the one or more shunt circuits are coupled to a ground at a first terminal and coupled to a supply voltage at a second terminal.

3. The structure of claim 1, wherein each electronic device of the one or* more electronic devices is coupled to a power supply of the one or more power supplies.

4. The structure of claim 1, wherein each electronic device of the one or more electronic device has an independent power supply of the one or more power supplies.

5. The structure of claim 1, wherein the one or more electronic devices comprise one or more cores, said one or more cores coupled to the one or more shunt circuits.

6. The structure of claim 5, wherein each core of the one or more cores is coupled to a power supply of the one or more power supplies and further coupled to one or more input/output pads.

7. The structure of claim 5, wherein each core has an independent power supply of the one or more power supplies.

8. A method for external control of one or more ESD devices coupled to one or more protected circuits, comprising one or more of:
    for any external contact of one or more external contacts coupled to one or more ESD devices operable to provide ESD protection to the one or more protected circuits performing at least one of the following to provide external control of the functionality of the one or more ESD devices through the one or more external contacts:
        grounding the external contact;
        one or more of one or more external contacts coupled to the one or more ESD devices;

supplying one or more DC signals to the external contact; and supplying one or more AC signals to the external contact.

9. The method of claim 8, wherein the one or more external contacts are coupled to the one or more ESD devices in a one to one correspondence.

10. A structure, comprising:

one or more shunt circuits coupled to the one or more electronic devices;

one or more external contacts coupled to the one or more shunt circuits, wherein any external contact of the one or more external contacts is operable to be coupled to any one of a ground signal, an AC signal and a DC signal;

one or more power supplies coupled to the one or more shunt circuits wherein one or more supply signals of the one or more power supplies are coupled to the one or more shunt circuits prior to the one or more shunt circuits being coupled to the one or more electronic circuits; and a means for performing one or more of the following to provide external control of the functionality of the one or more shunt circuits through the one or more external contacts;

grounding one or more of the one or more external contacts coupled to the one or more shunt circuits;

supplying one or more DC signals to one or more of the one or more shunt circuits via one or more of the one or more external contacts; and supplying one or more AC signals to one or more of the one or more shunt devices via one or more of the one or more external contacts.

\* \* \* \* \*

UNITED STATES PATENT AND TRADEMARK OFFICE
CERTIFICATE OF CORRECTION

| | | |
|---|---|---|
| PATENT NO. | : 7,203,043 B2 | Page 1 of 1 |
| APPLICATION NO. | : 10/448763 | |
| DATED | : April 10, 2007 | |
| INVENTOR(S) | : Jason Harold Culler et al. | |

It is certified that error appears in the above-identified patent and that said Letters Patent is hereby corrected as shown below:

On the face page, in field (57), under "Abstract", in column 2, line 10, delete "on" and insert -- one --, therefor.

On the face page, in field (57), under "Abstract", in column 2, line 10, after "grounding one or more of" insert -- the --.

In column 3, line 50, delete "couped" and insert -- coupled --, therefor.

In column 6, line 19, in Claim 1, delete "(ESD) discharge" and insert -- discharge (ESD) --, therefor.

In column 6, line 40, in Claim 3, delete "or* more" and insert -- or more --, therefor.

In column 8, line 8, in Claim 10, after "contacts" delete ";" and insert -- : --, therefor.

Signed and Sealed this

Twenty-sixth Day of August, 2008

JON W. DUDAS
*Director of the United States Patent and Trademark Office*